United States Patent

Kroker

Patent Number: 5,297,160
Date of Patent: Mar. 22, 1994

[54] FURNACE ELECTRODE DESIGN

[75] Inventor: Joseph F. Kroker, Aliquippa, Pa.

[73] Assignee: Mannesmann Aktiengesellschaft, Düsseldorf, Fed. Rep. of Germany

[21] Appl. No.: 820,411

[22] Filed: Jan. 10, 1992

[51] Int. Cl.$^5$ .......................................... F27D 23/04
[52] U.S. Cl. ..................................... 373/85; 373/60; 373/69; 373/71; 373/86; 75/10.66
[58] Field of Search ............. 373/60, 61, 62, 69, 373/70, 71, 48, 49, 50, 85, 86, 105, 108; 75/93 R, 61, 12

[56] References Cited

FOREIGN PATENT DOCUMENTS 1758726  3/1971  Fed. Rep. of Germany .
2602878  10/1983  Fed. Rep. of Germany .

*Primary Examiner*—Bruce A. Reynolds
*Assistant Examiner*—Tu Hoang
*Attorney, Agent, or Firm*—Schweitzer Cornman & Gross

[57] ABSTRACT

An arc furnace comprising a furnace vessel having a transverse axis and a central axis, electrodes disposed on a graduated circle, the electrodes projecting into the furnace vessel parallel to the central vertical axis, the electrodes are mounted on an electrode holding device of three supporting columns and three supporting arms, the center is located on the transverse axis at a predetermined distance from the center, the transverse axis being collinear with the middle one of the supporting arms, an electrode is disposed closest to the supporting columns at the intersection of the transverse axis and the graduated circle, and the other electrodes are disposed on the graduated circle an angle $\alpha = <110°$ with the electrode at the center of the circle.

5 Claims, 2 Drawing Sheets

FURNACE ELECTRODE DESIGN

FIELD OF THE INVENTION

The invention relates to a 3-phase arc furnace, particularly for melting steel, having a vessel with three electrodes disposed in a graduated circle in a manner to reduce wear of furnace walls.

BACKGROUND OF THE INVENTION

In 3-phase arc furnaces, an arc furnace burns between the tips of the electrodes and the molten metal in the furnace. In so doing, the arcs do not burn precisely vertically, but deviate sideways. With this so-called "blowing," the inner walls of the furnace walls in the vicinity of the arc are exposed to high thermal stresses. These regions of overheating lead to high wear in a refractory lining of the vessels. However, even in refractory-free walls, such as water-cooled panels, impediments or disorders may arise. In this connection, the wear of the wall is proportional to the output or power of the arc and the arc length and inversely proportional to the distance of the electrode from the wall. In addition, the refractory quality of lined furnaces and the control of the coolant in metallic walls play a role. Finally, reference is made to the procedure changing the output level during the melting process. For example, a high output level and a long arc are used for initial melting down of the furnace charge material, which is still predominantly solid, and, subsequently, short, high-energy arcs of higher ampere power are employed during the latter part of the melting-down process.

In addition, a method and an apparatus are known from German patent No. 2,602,878 for averaging and reducing the wear of the lining of the furnace wall, for which one deflecting magnetic field is generated for all the electrodes together below the bottom, in order to affect the development and direction of the arc. This expensive method, which is cost intensive with respect to the investment as well as during the operation, has not been able to eliminate in a satisfactory manner under the rough conditions of metallurgical plant operations the so-called sharp phase, that is, the asymmetric burning of the arcs.

The construction of a furnace vessel with a triangular shape for the purpose of making it easy to mount the blow-out coils is known from German published application No. 1,758,726. However, the furnace, which is known from this publication, entails additional costs for the special construction of the vessel, including the internal lining.

OBJECT OF THE INVENTION

It is an object of the invention to create a 3-phase arc furnace, which reliably, simply and inexpensively assures minimum wear of the inner wall of furnace vessels.

SUMMARY OF THE INVENTION

This objective is accomplished by arranging the electrodes in a specific new and improved geometric relationship with the furnace walls. Specifically, and as defined in the claims hereto, the electrodes are arranged at these points on a graduated circle, which circle itself is centered in a particularly advantageous relationship with the major axes of the furnace vessel.

While retaining the size (diameter) of graduated circle of the electrodes adapted heretofore for a corresponding furnace size, the center of this graduated circle is moved away from the supporting column side of the arc furnace. The enlargement of the distance of the electrode proximate to this wall region has a direct effect on the wear behavior of the internal lining of the vessel.

At the same time, the mutual arrangement of the electrodes is altered in such a way, that they are no longer disposed on the graduated circle as previously was the case with the angle at the center always being 120°. Surprisingly, it has been discovered that the selection of an angle at the center that is clearly below 120° barely impedes the supply of electrical energy. Accordingly, the power loss remains at a minimum. At the same time, however, there is a positive effect on the nature of furnace wall, namely a wear reduction in wear is achieved without the need for additional passive energy, for example, for operating magnetic coils.

This inventive arrangement of electrodes can be employed not only in vessels with a circular cross section but also to great advantage in vessels with an oval cross section. In the case of oval vessels, the distance of the electrode shells to the inner wall of the vessel can be mutually adjusted by the geometric circumstances of the separation of the two halves of the circle.

For a better appreciation of the invention and the benefits to be obtained from its practice, reference should be made to the following detailed description of the invention taken in conjunction with the accompanying drawing. An embodiment of the invention is shown in the drawing, it being understood that this embodiment is given by way of illustration and not by way of limitation. Thus, for example, while the specification and the claims may refer to the electrode arrangement of the present invention as being useful in electric melting furnaces, it is to be understood, however, that the invention can also be employed in ladling furnaces and other metallurgical vessels.

DETAILED DESCRIPTION OF THE INVENTION

Figure 1:
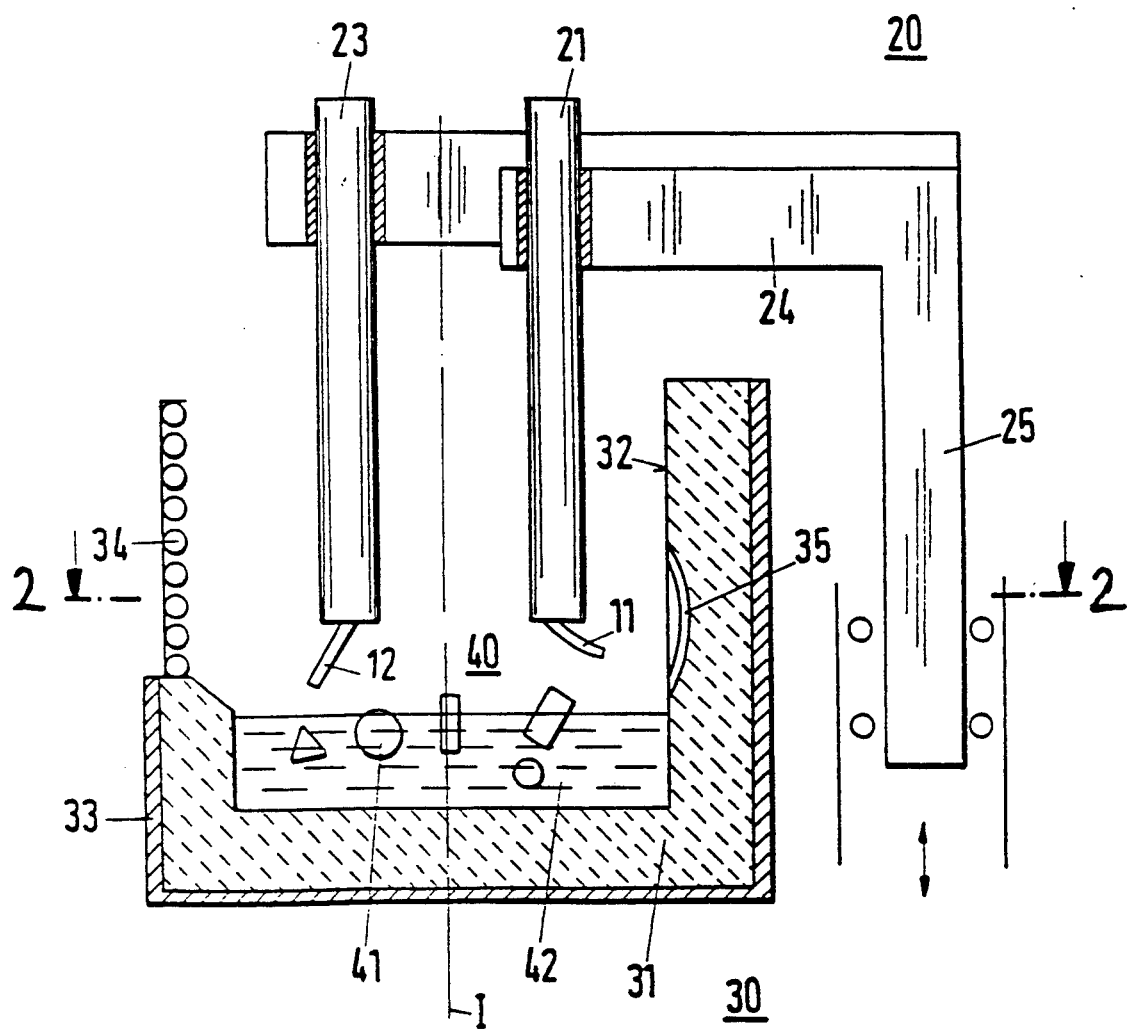
FIG. 1 is a vertical cross section through an arc furnace embodying the principles of the invention.

FIG. 1 shows an arc furnace vessel 30 with an electrode holding apparatus 20 which can be moved vertically, in a conventional manner. The apparatus 20 has vertical supporting columns 25, on which horizontal supporting arms 24 are disposed, which guide the three electrodes 21 to 23 parallel to the central vertical axis I. The electrodes 21 to 23 project downwardly into the furnace vessel 30. At the tips of the electrodes electric arcs 11, 12 are shown schematically.

The molten material 40 comprising solid scrap parts 41, and fusible material 42, constitute the charge in the vessel 30.

The arc 11 is shown as "blowing" and thus has an effect on the refractory lining 31 in the wear region 35.

At the left side of the vessel, a tubular wall or panel 34, which is free of any refractory material and through which a suitable coolant is circulated, is shown diagrammatically.

Figure 2:
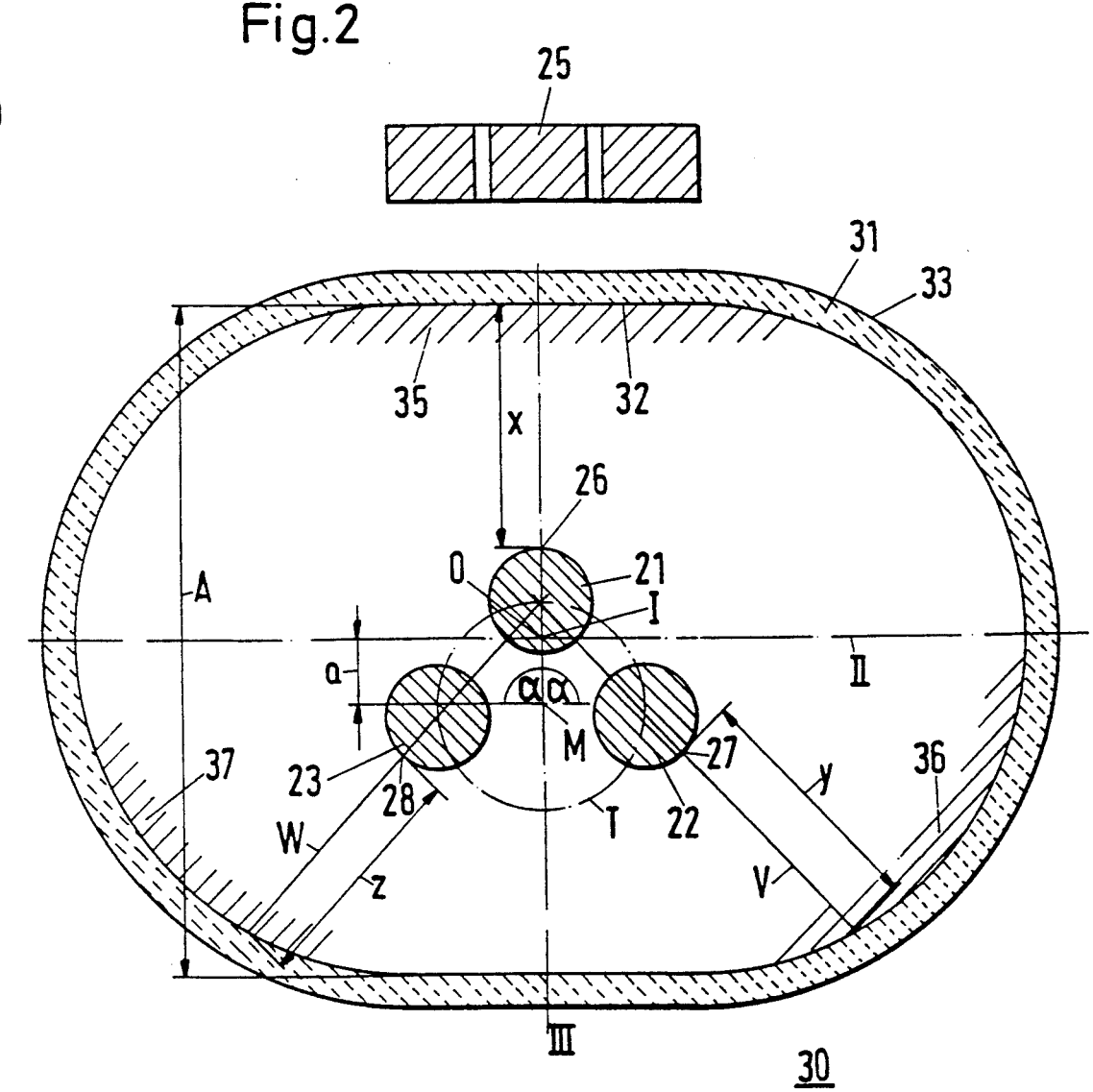
FIG. 2 is a horizontal section through the furnace vessel of FIG. 1 taken along the line 2—2 of FIG. 1.

FIG. 2 shows the section A—A of FIG. 1 for a vessel 30 having an oval outline. The vessel 30 has a metallic shell 33, which is provided with a thick refractory lining 31. In addition, the longitudinal furnace axis II and the transverse furnace axis III intersect at the center O of the vessel with the central furnace axis I.

Electrodes 21, 22 and 23 protrude into the vessel 30. The centers of the electrodes 21-23 lie on a graduated circle T, the center M of which is on the transverse axis III. The center M of the graduated circle T is offset by a distance "a" from the center O of the vessel 30. The inner walls 32 are apart from each other by a distance A.

The center of the electrode 21 lies at the intersection of the graduated circle T and the transverse axis III. The electrode 21 is located closest to the supporting column 25. The angle at the graduated circle center M between the electrode 21 and the electrodes 22 and 23 is designated α. Secant V extends through the centers of the electrodes 21 and 22 and secant W extends between the centers of the electrodes 21 and 23.

The length of secant V from the inner wall surface 32 of the furnace to the outer surface 27 of the electrode 22 is designated y. The length of the secant W from the inside surface 32 of the vessel to the outer surface 28 of the electrode 23 is designated z. The distance from the inner surface 32 to the outer surface 6 of the electrode 21 is designated x. As shown, the dimensions x, y and z are approximately the same. The regions and limits of maximum internal wall surface wear are shown schematically and labeled 35, 36 and 37.

I claim:

1. A three-phase electric arc furnace, comprising a furnace vessel having a notional vertical central vessel axis and a notional horizontal transverse vessel axis that is perpendicular to said central vessel axis, a central electrode and two peripheral electrodes disposed on each side of said central electrode, said three electrodes each having a notional vertical central electrode axis, said electrodes being disposed with their respective notional vertical central electrode axes to define a periphery of a notional horizontal circle, the center of said notional horizontal circle being disposed parallel to said notional vertical central vessel axis, means for vertically suspending each of said electrodes in said furnace vessel, said notional horizontal transverse vessel axis intersecting with the center of said notional horizontal circle and with said notional vertical electrode axis of said central electrode, said notional vertical central electrode axis being disposed from the other two of said notional vertical electrode axes along said notional horizontal circle at a maximum angle from said center of said notional horizontal circle of less than 110°.

2. The three-phase electric arc furnace of claim 1, wherein said furnace vessel has an oval cross section.

3. The three phase electric arc furnace of claim 1, wherein said furnace vessel has inner walls, and the notional vertical central vessel axis and said center of said notional horizontal circle are disposed from one another at a distance of from 0.06 to 0.12 times the distance between said inner walls along said notional horizontal transverse vessel axis.

4. The three-phase electric arc furnace of claim 1, wherein said maximum angle is between 95° and 100°.

5. The three phase electric arc furnace of claim 3, wherein the distance between said inner walls of said furnace and an exterior surface of a peripheral electrode along a notional line passing through the notional vertical central electrode axes of the central electrode and a peripheral electrode is substantially within a tolerance of ±5% equal to the distance between an exterior surface of said central electrode and a closest point on an inner wall of said furnace along said notional horizontal transverse vessel axis.

* * * * *